(12) United States Patent
Hertel et al.

(10) Patent No.: US 8,578,786 B2
(45) Date of Patent: Nov. 12, 2013

(54) MEASURING ARRANGEMENT WITH AN OPTICAL SENSOR

(75) Inventors: Martin Hertel, Steien (DE); Rainer Hocker, Waldshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 155 days.

(21) Appl. No.: 13/140,457

(22) PCT Filed: Dec. 11, 2009

(86) PCT No.: PCT/EP2009/066910
§ 371 (c)(1),
(2), (4) Date: Jun. 17, 2011

(87) PCT Pub. No.: WO2010/069868
PCT Pub. Date: Jun. 24, 2010

(65) Prior Publication Data
US 2011/0247430 A1    Oct. 13, 2011

(30) Foreign Application Priority Data

Dec. 18, 2008  (DE) .................. 10 2008 054 915

(51) Int. Cl.
*G01F 1/32* (2006.01)
(52) U.S. Cl.
USPC ..................................... 73/861.22
(58) Field of Classification Search
USPC .................. 73/861.22, 861.23, 861.355
See application file for complete search history.

(56) References Cited

U.S. PATENT DOCUMENTS

| 4,416,159 | A |   | 11/1983 | Williamson |
| 4,706,502 | A |   | 11/1987 | Jones |
| 4,711,132 | A | * | 12/1987 | Dahlin ................ 73/861.356 |
| 4,878,386 | A | * | 11/1989 | Isobe et al. ............ 73/861.22 |
| 4,891,990 | A |   | 1/1990  | Khalifa |
| 6,722,209 | B1|   | 4/2004  | Fan |
| 7,045,767 | B2|   | 5/2006  | Peng |
| 2002/0129662 | A1 |   | 9/2002 | Gysling |
| 2004/0086228 | A1 |   | 5/2004 | Rumpf |
| 2006/0230841 | A1 |   | 10/2006 | Shrikrishna |
| 2011/0083515 | A1 | * | 4/2011 | Phillips |

FOREIGN PATENT DOCUMENTS

| EP | 0 188 492 B1 |   | 7/1986 |
| GB | 2 088 555 A  |   | 6/1982 |
| GB | 92/01208     | * | 6/1991 |
| WO | WO 92/01208  |   | 1/1992 |

OTHER PUBLICATIONS

German Search Report.
International Search Report.
English translation of the IPR.
Z. L. Ran et al., "Miniature In-Line Photonic Crystal Fiber Etalon Fabricated by 157 NM Laser Micromachining", Optics Letters, Optical Society of America, Washington, D.C., Bd. 32, Nr. 21, Nov. 1, 2007.

* cited by examiner

*Primary Examiner* — Jewel V Thompson
(74) *Attorney, Agent, or Firm* — Bacon & Thomas, PLLC (57) ABSTRACT

A measuring arrangement for determining a chemical and/or physical, measured variable-especially a volume flow and/or mass flow-of a measured material flowing through a pipeline, wherein the measuring arrangement comprises a measuring transducer, wherein the measuring transducer includes at least one optical waveguide, which serves for producing, registering and/or transmitting measurement signals, and wherein the registering of the measuring signals in the optical waveguide occurs by means of a Fabry-Pérot sensor.

17 Claims, 5 Drawing Sheets

MEASURING ARRANGEMENT WITH AN OPTICAL SENSOR

TECHNICAL FIELD

The invention relates to a measuring arrangement for determining a chemical and/or physical, measured variable, especially a volume flow and/or mass flow of a measured material flowing through a pipeline.

BACKGROUND DISCUSSION

Flow measuring systems currently often use change in electrical capacitance, electrical conductivity or electrical voltage to determine volume- and/or mass flow.

A vortex, flow measuring system comprises, for example, among other things, a bluff body, which produces, further downstream, a Kármán vortex street. The pressure fluctuations of the vortex street are registered by a sensor blade. The periodic pressure fluctuations excite the sensor blade to a periodic oscillation. The movement of the sensor blade is, for example, read out with the assistance of a piezo sensor. A disadvantage of this technology lies in the limiting of the operating temperature of the flow measuring device caused by the read-out mechanism and the necessity of an on-site electronics for reading the piezo sensor, which require complex temperature insulation and measures for explosion protection for the electronics, in order to be able to achieve operating temperatures of 400° C. or more. Vortex flow measuring systems, which function without sensor blades, and in the case of which the pressure fluctuations are registered directly by a measuring transducer placed in or on the bluff body, are also known.

Coriolis-flow measuring systems utilize phase shift of a vibrating measuring tube caused by the mass of a measured material. The accessing of the signal usually occurs via plunger coils. This reading must, among other things, be corrected for temperature.

DE 603 11 048 T2 discloses a method for manufacturing a fiber optical Fabry-Pérot interferometer. The interferometer is composed, in such case, of a pair of oppositely lying optical fiber end surfaces, which are placed on a carrier material.

DE 692 26 446 T2 discloses an apparatus, which registers the oscillations of a Coriolis-mass flow-measuring device by means of an optical fiber. For such purpose, the weakening, or the degree of weakening, of an optical signal resulting from the bending of the optical fiber is utilized.

DE 41 22 799 A1 discloses an apparatus for measuring the velocity of a fluid. This apparatus includes a transducer, which again has a rod-shaped appendage. The rod-shaped appendage is responsible for modulating an optical signal transmitted via an optical waveguide.

Due to the precision required in the construction of the measuring apparatus, or due to the danger of a contamination and/or of damage, such arrangements and manufacturing processes are time-consuming and expensive.

An option for detecting length changes is to utilize various optical methods. Known methods operate in such case on an interferometric basis. For example, by means of UV lithography, a Bragg grating can be implemented inside of an optical fiber. In the case of this method, light is radiated, broadband, into the waveguide. The Bragg grating produces a Bragg reflection at a defined wavelength. This wavelength depends equally strongly on temperature and length expansion. Thus, in the case of this method, it is not directly possible to distinguish between temperature related and length change related effects.

All of the measuring systems named have the disadvantage that, in the case of higher temperatures, a deformation of the optical resonator or of the optical reflection surfaces occurs, or the measuring transducer is even completely destroyed.

Recently, fiber optical sensors have become known, which also function at temperatures of 800° C., and thus exceed the thermal usage range of previously known sensors by several hundred degrees Celsius. For production of such sensors, a Fabry-Pérot resonator is micro-manufactured in an optical fiber by means of a laser. The facettes arising through the manufacture of the gap on the ends of the optical waveguide have mirror-like properties. The temperature independence results from the fact that the core of the optical fiber thusly manufactured expands in the case of a temperature increase, and presses the two resonance surfaces closer together. At the same time, the jacket (cladding) of the optical fiber expands and draws the resonance surfaces apart. These two effects overlap with each other and result in a small but random temperature dependence (compare Optics Letters, Nov. 1, 2007, pp. 3071-3073; Photonics Spectra, December 2007 "To boldly go where no sensor has gone before").

SUMMARY OF THE INVENTION

An object of the invention is to provide a measuring arrangement for determining a chemical and/or physical, measured variable of a measured material flowing through a pipeline, wherein the measuring arrangement functions precisely and reliably even in the case of high temperatures.

The object is achieved according to the invention by the feature that the measuring arrangement comprises a measuring transducer, wherein the measuring transducer includes at least one optical waveguide, which serves for producing, registering and/or transmitting measurement signals, wherein the registering of measuring signals by the optical waveguide occurs by means of a Fabry-Pérot sensor. A Fabry-Pérot sensor most often comprises an interferometer made of two, especially planparallel mirrors of high reflectivity, which form with one another an optical resonator, and, which are partially transmissive for an electromagnetic wavelength radiated into the resonator. An advantage of the invention is that, due to the Fabry-Pérot sensor, the measuring signals registered and transmitted in the optical waveguide are essentially independent of external mechanical and/or thermal influences. As a result, mainly the properties of the optical waveguide are relevant for an evaluation of the measuring signals. Environmentally related disturbance effects can be minimized due to the optical registering and transmission of the measurement signal. Due to the comparatively low expansion of the Fabry-Pérot sensor, the measuring signals can be registered at a precisely defined position in the optical waveguide. The measuring transducer of the invention consequently enables a more exact determining of the measured variable. Additionally, the measuring arrangement can be applied for producing, registering and/or transmitting a measurement signal in the case of difficult environmental conditions—such as, for example, high temperatures—or in explosion endangered regions. The measuring signals can also be produced directly via the optical waveguide, in that the optical waveguide is, for example, brought into the pipeline and exposed to the flowing measured material. The measurement signals are, for example, length changes occurring due to pressure fluctuations or due to vibrations.

In an embodiment, the Fabry-Pérot sensor is at least partially composed of the optical waveguide. For example, a mirror of the Fabry-Pérot interferometer can be composed of a mirroring surface of an end an optical glass fiber. The measuring transducer can thereby be embodied in an especially space-saving manner.

In a form of embodiment, the Fabry-Pérot sensor is installed in the optical waveguide. For such purpose, the Fabry-Pérot interferometer is, for example, installed in the course of the optical waveguide in that a gap is manufactured between two end surfaces of the optical waveguide.

In an embodiment, the Fabry-Pérot sensor includes an optical resonator, which is located completely in the optical waveguide. The optical waveguide can, in such case, especially comprise an optical fiber or a bundle of optical fibers. For accessing the signal and for transmitting the signal, especially a measurement signal, optical waveguides, for example in the form of fibers, can currently be used. In such case, signal transmission by means of light waves through optical fibers has numerous advantages compared to electrical signal transmission. Optical signals are not subject to electrical disturbing influences, are safe in an easily ignitable environment, and the installation is very compact. By means of optical waveguides, large distances between measuring transducer and transducer electronics are implementable. The connection is in such case not sensitive to electromagnetic disturbances, and can be extended in an explosion safe manner.

The combination of a Fabry-Pérot interferometer and an optical waveguide enables the use of a Fabry-Pérot-based length measuring for determining a chemical and/or physical, measured variable of a measured material flowing through a pipeline. The low, temperature dependence of the length measuring and the high temperature resistance of the optical waveguide, as well as the opportunity to only need to transport light with low energy into explosion protected regions of a process enables the manufacture of products with clear advantages. The optical waveguide can, in such case, be composed of a glass and/or a synthetic material.

An on-site electronics, such as in the case of applications using the principle of the piezo element, is not necessary. Complicated measures for heat insulation of the electronics can therefore be omitted, and, due to the properties of the optical waveguide, it is possible to convey the raw signals corresponding to the measured variable out of the explosion protected region. Furthermore, extensive measures for explosion protection become unnecessary.

In an additional embodiment, the optical waveguide includes a core and a cladding, and the optical resonator comprises at least one gap in the core of the optical waveguide. The gap is, for example, an air gap. The gap can also be present in the cladding of the optical waveguide, and extend diametrally through the optical waveguide. Especially when the optical waveguide is composed of a fiber bundle, the cladding can be a region located around the core of the waveguide and having a lower index of refraction than the core of the optical waveguide. Furthermore, the optical waveguide can be surrounded by a protective insulation.

In a form of embodiment, the optical waveguide is an optical single-mode waveguide, especially a single-mode glass fiber. The ends of optical glass fibers can possess partially reflecting surfaces. Via a gap between two optical glass fiber ends, which have reflecting surfaces, an optical resonator can be formed. A change in the distance between the ends of the optical glass fiber(s) changes the strength of the intensity due to the changing interference conditions in the resonator. In this way, a simple and robust Fabry-Pérot sensor can be produced.

In a form of embodiment, the measuring arrangement is a vortex, flow measuring system having a bluff body arranged along a diameter of the pipeline and connected on at least one securement location with the pipeline, this bluff body serving for producing Kármán vortices. The measuring arrangement can alternatively or additionally have a sensor blade for registering pressure fluctuations produced by the vortices. Through use of the Fabry-Pérot interferometer integrated into the optical waveguide, a considerable simplifying of the construction of the vortex, flow measuring system is achieved.

In an embodiment, the bluff body and/or the sensor blade is introduced externally through a bore in the measuring tube wall and the bluff body and/or the sensor blade includes a membrane covering the bore. The optical waveguide with its integrated Fabry-Pérot interferometer can be secured, for example, to the membrane, and a sensor sleeve for registering the measurement signal can thereby be omitted.

In an additional embodiment, the optical waveguide is mechanically coupled with the bluff body and/or the sensor blade and/or the membrane, and reacts to movements of the bluff body, the sensor blade, or the membrane through a length change. Via the Fabry-Pérot interferometer integrated in the optical waveguide, the length changes occurring on the bluff body and/or on the sensor blade can thus be registered.

In an embodiment, the optical waveguide is connected with the bluff body and/or with the sensor blade in such a manner, that the Kármán vortices produce length changes in the optical waveguide. The length change of the optical waveguide effects, in turn, a change in the resonance conditions in the optical resonator of the Fabry-Pérot interferometer.

In a further development, the frequency, with which the Kármán vortices are shed from the bluff body, is determinable from an interference pattern, which is derived from the intensity of the measurement signal transmitted through the optical waveguide. The intensity of the measurement signal transmitted through the optical waveguide can be determined, for example, by means of a photosensor or photodetector, especially a photodiode. From the interference pattern, the volume flow can then be determined. In this regard, for example, at least one length of time between two intensity values occurring in the curve of the intensity of the measurement signal versus time, especially between essentially equal intensity values is ascertained. The intensity values are preferably intensity maxima. Especially preferably, they are essentially equal intensity values, which, however, occur in the case of different lengths of the resonator, especially in the case of a length change of the resonator in an amount equalling a multiple of half of the wavelength of the radiated light. An intensity maximum always occurs when the length d of the resonator essentially amounts to a multiple of half of the wavelength $\lambda$ of the electromagnetic wave radiated into the optical waveguide. The relationship between the frequency, with which the Kármán vortices are shed from the bluff body and the ascertained length of time can be ascertained, for example, by calibration. As a function of the frequency of the shedding of the vortices from the bluff body—that is as a function of the flow velocity of the measured material—the length of time between two intensity values in the curve of intensity versus time also changes.

In a form of embodiment, the measuring arrangement is a Coriolis, mass flow measuring system having at least one measuring tube, which vibrates in measurement operation, and the optical waveguide is mechanically coupled with the measuring tube, and the optical waveguide reacts to vibrations of the measuring tube with a length change. The vibrations of the measuring tube can therewith be determined with high accuracy and also largely independently of surrounding conditions. For such purpose, the optical waveguide with its integrated Fabry-Pérot interferometer is affixed on the measuring tube in such a manner, that the measuring tube, which is excited to execute vibrations, produces a length change of the optical waveguide and, respectively, of the Fabry-Pérot resonator integrated therein.

In an additional form of embodiment, from an interference pattern, which is derived from the intensity of the measurement signal transmitted through the optical waveguide, the frequency of the vibrations of the measuring tube is determinable, or, in the case of two measuring tubes, the phase shift between the respective frequencies of the two measuring tubes is determinable. For such purpose, intensity maxima and minima are distinguished, for example, and, in this way, a resolution of the length change of the resonator contained in the optical waveguide of up to a fourth of the wavelength of the in-radiated light is achieved.

In a form of embodiment, for determining the intensity of the measurement signal and/or of the interference pattern, at least one photodiode is provided, which produces an electrical signal corresponding to the measurement signal. The photodiode serves for producing an electrical signal from the light introduced into and, respectively, brought out of the optical waveguide. Via the photodiode, the interference pattern can be converted into an electrical signal and can be transmitted to an evaluation unit.

The invention relates to an optical evaluation method for detecting small length changes in the measuring transducer of a flow measuring system, these changes being produced by the flow of essentially liquid and/or gaseous, measured substances, especially based on the principle of vortex, flow measurement and Coriolis, flow measurement.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
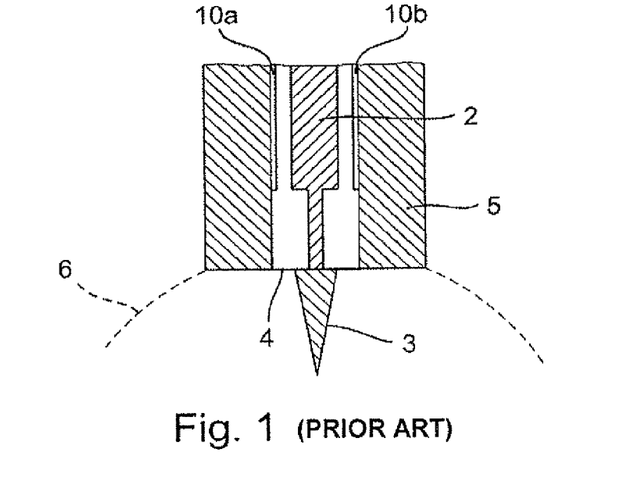
FIG. 1 is a measuring transducer of a vortex, flow measuring system with capacitive signal pickup as known from the state of the art.

FIG. 1 shows a cross section through the measuring transducer of a vortex, flow measuring system as known from the state of the art.

The vortices (not shown) formed on the bluff body produce in the flow local pressure fluctuations, which are registered via a sensor and converted into electrical signals. The sensor is either integrated into the bluff body 9 or, as in the case of the sensor blade 3 shown in FIG. 1, the sensor is located directly behind the bluff body 9.

Periodically occurring vortex pressure fluctuations exert forces on the paddle-shaped sensor blade 3 behind bluff body 9. This paddle transmits the movement to a sleeve-like, middle electrode, which, with the outer electrode, which is divided into two half shells 10a, 10b, forms the capacitances C1 and C2. Via the change in the gap width, a periodically varying capacitance change proportional to the vortex pressure frequency arises, which is evaluated in the measuring electronics (not shown) connected thereafter.

Figure 2:
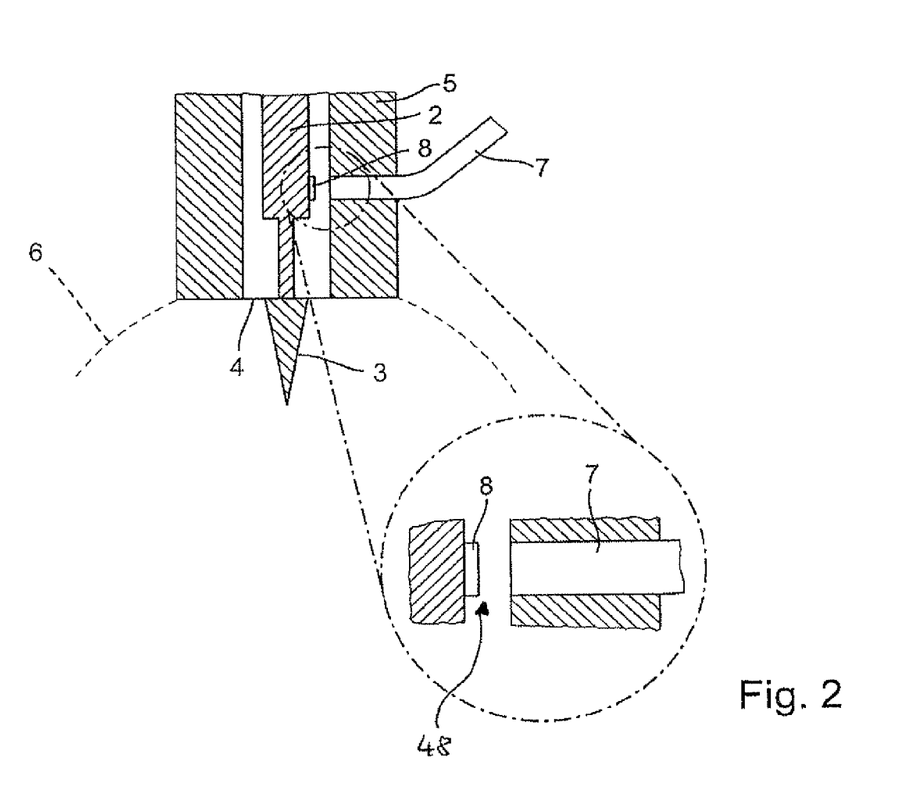
FIG. 2 is a schematic representation of an arrangement of a measuring transducer of a vortex, flow measuring system with an optical signal pickup.

FIG. 2 shows a cross section through a measuring transducer of a vortex, flow measuring system 1 of the invention, especially through the paddle-shaped sensor blade 3. The deflections of sensor sleeve 2 are registered via a Fabry-Pérot interferometer. The Fabry-Pérot interferometer is composed of a mirror element 8 and an end of the optical waveguide 7. Mirror element 8 and the end of the optical waveguide form an optical resonator. For such purpose, an optical waveguide 7 in the form of an optical fiber is led through the housing wall 5 of the measuring transducer. On sensor sleeve 2, a mirror element 8 is additionally placed, which reflects the signal transmitted via optical waveguide 7. A deflection of sensor sleeve 2 results in a change in the distance between mirror element 8 and optical waveguide 7. In this way, the interference conditions of the resonator change. As a result, the intensity of the optical signal transmitted via optical waveguide 7 changes. The condition for constructive interference at the distance d between optical waveguide 7 and mirror element 8 corresponds to: $2d=N\lambda$ wherein N is a positive whole number and $\lambda$ is the wavelength of the electromagnetic wave radiated into optical waveguide 7.

Via the reflection off of mirror element 8, the optical signal is turned back into the optical waveguide 7, and thus is superimposed on the originally fed-in signal. The interference signal thus formed can be registered via a photo-diode (not shown), onto which the interference signal is projected. For such purpose, the optical signal, after it is reflected off of mirror element 8, is led back through optical waveguide 7. The optical signal consequently changes its intensity as a function of the resonance conditions. This change can be presented as a function of the time. The interference pattern thus obtained does not correspond directly to the movement of mirror element 8 placed on the sensor sleeve 2, but rather to the cycle of the distance d between the open end of optical waveguide 7 and mirror element through distances that lead to constructive or to destructive interference. By counting the intensity maxima and/or minima, the amplitude of the deflection of, for example, the sensor sleeve 2 shown here can be determined. By distinguishing between the intensity maximum and intensity minimum, a resolution accurate to within a fourth of the wavelength of the radiated light can be achieved. The wavelength of the electromagnetic signal transmitted in such case through optical waveguide 7 can lie in a range greater than the optical wavelength range, both in the ultraviolet as well as also in the infrared wavelength range.

The optical waveguide 7 can comprise, for example, a core 42 of glass fiber with a cladding 41 and/or a protective coating of synthetic material.

FIG. 2 includes an enlarged representation of the optical resonator 48. The resonator 48 is composed of the reflecting surface of the end of optical waveguide 7 and mirror element 8. Optical waveguide 7 is secured on or in wall 5 of the measuring transducer. Placed on the sensor sleeve 2 opposite the end of optical waveguide 7 is a mirror element 8. This mirror element 8 reflects the light emerging from optical waveguide 7 back into the optical waveguide 7.

Figure 3:
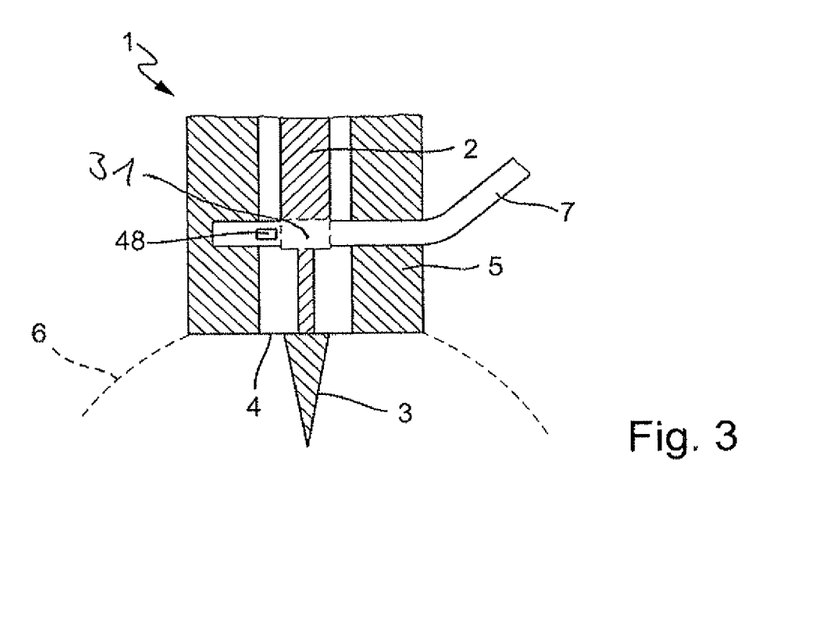
FIG. 3 is a schematic representation of an optical waveguide having an integrated Fabry-Pérot interferometer and secured to the sensor sleeve.

FIG. 3 shows an optical waveguide 7 with an integrated Fabry-Perot interferometer. The optical waveguide 7 is affixed at least to the sensor sleeve 2 and to a wall 5 surrounding the vortex, flow measuring transducer. The Fabry-Pérot resonator 48 is arranged between the affixing point on sensor sleeve 31 and the affixing point on the wall. The resonator is formed by two end surfaces, which, by means of micro-manufacturing, have mirror-like properties. In the region of sensor sleeve 2, the optical waveguide is affixed—for example, via adhesion—to sensor sleeve 2. The resonator 48 of the Fabry-Pérot interferometer is, in such case, integrated into the optical fiber of the waveguide 7. Resonator 48 typically has a length of 10 to 100 µm. A deflection of sensor blade 3 effects a corresponding deflection of sensor sleeve 2, and results in an expansion and/or compressive shortening of the optical waveguide 7. In this way, the dimensions and the resonance condition of resonator 48 change, and an interference signal forms in optical waveguide 7.

Due to the coupling of the Fabry-Pérot interferometer to the sensor sleeve, the movements of the sensor sleeve are transmitted to resonator 48. The resonator consequently changes resonance conditions as a function of the movement of the sensor sleeve. The length of resonator 48 can be chosen to lie within a range of 10 times to 100 times the wavelength of the light radiated into the optical waveguide. A length change of resonator 48, in contrast, lies in the region of a tenth of the length of the resonator. In the case of a length change of the resonator of approximately a tenth of its length, accordingly, up to one hundred intensity maxima can occur.

Figure 4:
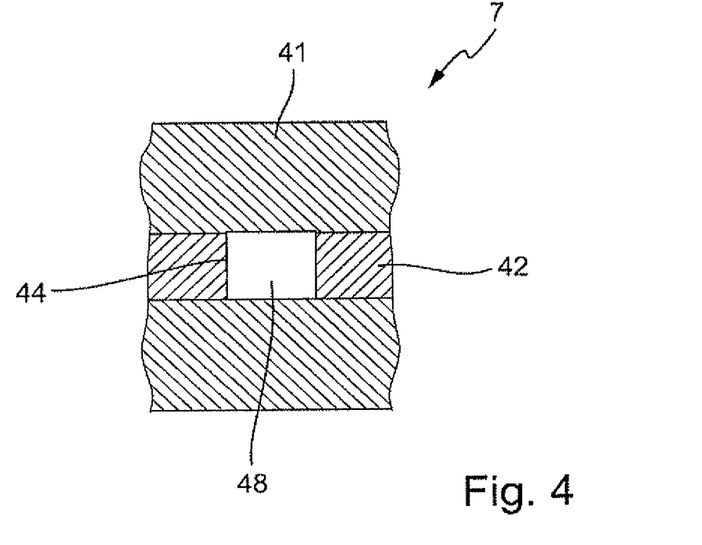
FIG. 4 is a schematic illustration of a Fabry-Pérot interferometer integrated into an optical waveguide.

FIG. 4 shows an enlarged view of the Fabry-Pérot interferometer integrated into the optical waveguide 7. Optical waveguide 7 is composed, in such case, of a cladding and a core 42. Additionally, optical waveguide 7 is surrounded by a protective coating (not shown). Core 42 is, in such case, composed for example of a glass fiber. This core 42 is surrounded by cladding 41—for example, likewise surrounded by glass fibers with a lower index of refraction. The gap in core 42 is, for example, micro-manufactured by means of a laser. By the thus arising end surfaces 44 of the optical fibers, a Fabry-Pérot resonator 48 is formed. The end surfaces 44 of the resonator 48 have mirror-like properties. The gap micro-manufactured by means of the laser need not be limited to core 42, but can also partially exist in cladding 41 of optical waveguide 7.

Figure 5:
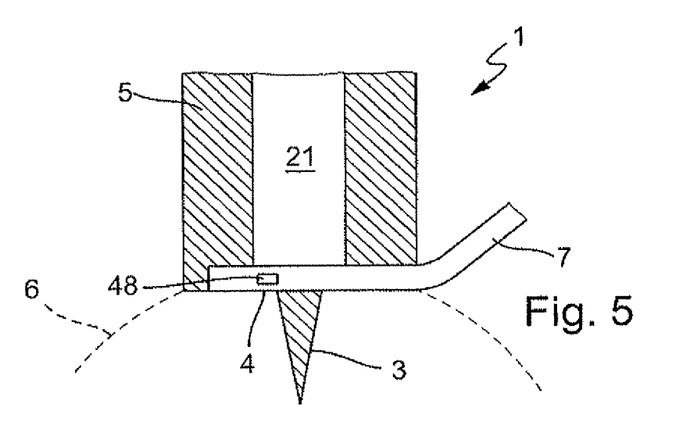
FIG. 5 is a schematic representation of an optical waveguide having an integrated Fabry-Pérot interferometer, wherein the waveguide is attached to the membrane of a vortex, flow measuring system.

FIG. 5 shows another form of embodiment of a vortex, flow measuring system with an optical waveguide 7 having an integrated Fabry-Perot interferometer. Optical waveguide 7 is, in such case, secured on the membrane 4 of the measuring transducer. An end of optical waveguide 7 is connected with wall 5 of the measuring transducer. Fabry-Pérot resonator 48 is located on membrane 4, between wall 5 of the measuring transducer and sensor blade 3. In the region of membrane 4, optical waveguide 7 lies, in such case, essentially planarly on membrane 4. In FIG. 5, optical waveguide 7 runs at the height of membrane 4 through wall 5 of the measuring transducer housing of the vortex, flow measuring device, and is connected with an evaluation unit (not shown). It is also possible to lead optical waveguide 7 out through the lumen 21 of measuring arrangement 1. In the case of the measuring arrangement 1 shown in FIG. 5, a sensor sleeve 2 for registering the measuring signals can be omitted.

Figure 6:
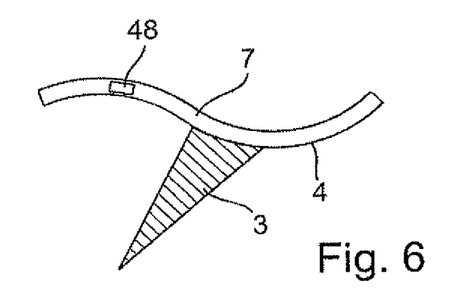
FIG. 6 shows, schematically, and not to scale, the deflected membrane and the membrane attached, optical waveguide with integrated Fabry-Pérot interferometer.

FIG. 6 shows—not true to scale—a deflection and, respectively, deformation of sensor blade 3 and membrane 4, as well as of the optical waveguide 7 secured on membrane 4, occurring due to pressure changes resulting from the vortices influencing sensor blade 3. Optical waveguide 7 is placed essentially planarly on membrane 4 and is, for example, affixed by means of an adhesive. Through the deflection of sensor blade 3, membrane 4 is deformed. This results in a corresponding deformation of optical waveguide 7 and of the Fabry-Pérot resonator 48 integrated into optical waveguide 7. The change in the resonance conditions of Fabry-Pérot resonator 48 caused thereby allow an interference signal to arise, from, which the deflection of sensor blade 3, the frequency of the vortices in the measured material and thus the flow volume can be determined.

Figure 7:
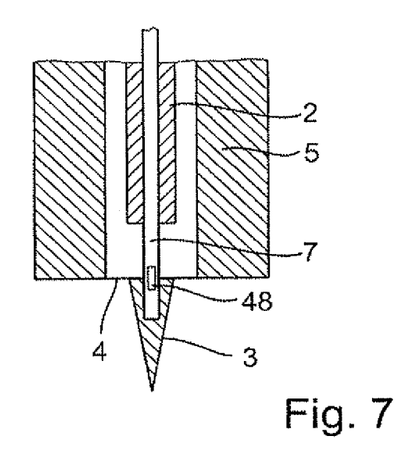
FIG. 7 is a schematic representation of an optical waveguide with integrated Fabry-Pérot interferometer, wherein the waveguide is secured on or in the sensor blade.

FIG. 7 shows a cross section through a measuring transducer of a vortex, flow measuring device. Optical waveguide 7 is secured directly to the sensor blade 3. Optical waveguide 7 is centrally installed in sensor blade 3. A deflection of sensor blade 3—for example, the deflection of sensor blade 3 shown in FIG. 6—then likewise leads to a change in the resonance conditions in the Fabry-Pérot resonator 48 of optical waveguide 7, and the flow volume of the measured material flowing through the measuring tube 6 can be determined as a result of the interference signal or of the interference pattern.

Figure 8:
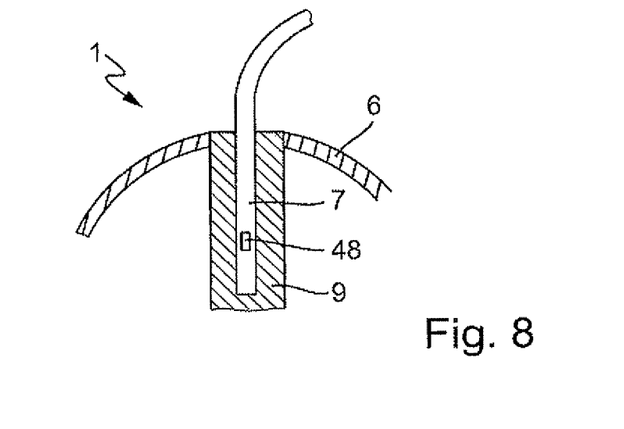
FIG. 8 is a schematic representation of an optical waveguide with integrated Fabry-Pérot interferometer, wherein the waveguide is secured on the bluff body of a vortex, flow measuring system.

FIG. 8 shows a cross section through a bluff body 9 of a vortex, flow measuring system. For registering the measurement signal, optical waveguide 7 with its integrated Fabry-Pérot resonator 48 is directly integrated in the bluff body 9. The shed vortices bring about deflections of the bluff body 9, similar to those of sensor blade 3. These deflections of bluff body 9 can be detected by means of the Fabry-Pérot interferometer integrated into optical waveguide 7. The securement of optical waveguide 7 and the reading out of the measurement signal occurs, in such case, analogously to the preceding examples of embodiments.

Figure 9:
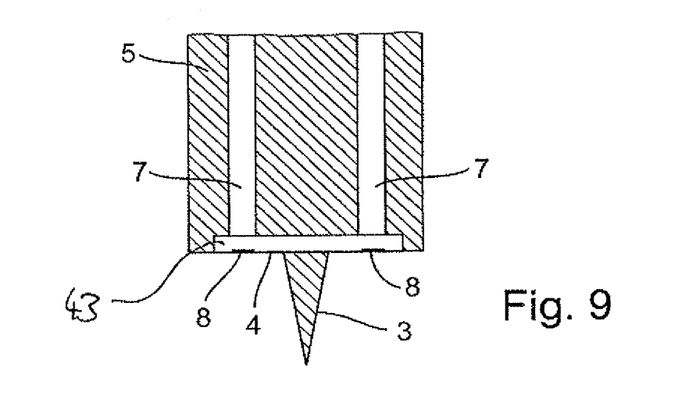
FIG. 9 is a schematic representation of a first and second optical waveguide connected with the membrane of a sensor blade.

FIG. 9 shows an additional measuring transducer of a vortex, flow measuring device. The measuring transducer includes two optical waveguides 7, which extend within the measuring transducer. On the membrane 4, opposite an end of the first and of the second optical waveguides, is in each case placed a mirror element 8, which reflects the signal transmitted through the first or second optical waveguide 7 back into the first or second optical waveguide 7. In this way, a redundance of the signals is achieved, and possible disturbances occurring in a signal path can be recognized. The first and the second mirror elements 8 are, in such case, arranged essentially diametrally opposite one another. The first and, respectively, the second mirror elements are, in such case, separated from the ends of the first and, respectively, the second optical waveguides 7 by air gaps 43 of length in the µm range.

Alternatively, a Fabry-Pérot interferometer integrated into the first and/or second optical waveguide 7, or a Fabry-Pérot resonator 48 integrated into the optical waveguide, can be used. For such purpose, the first and the second optical resonators 48 are, at their ends, arranged essentially diametrally to one another, and the first and/or second optical waveguide 7 are/is connected with the membrane 4 of the vortex, flow measuring device.

Figure 10:
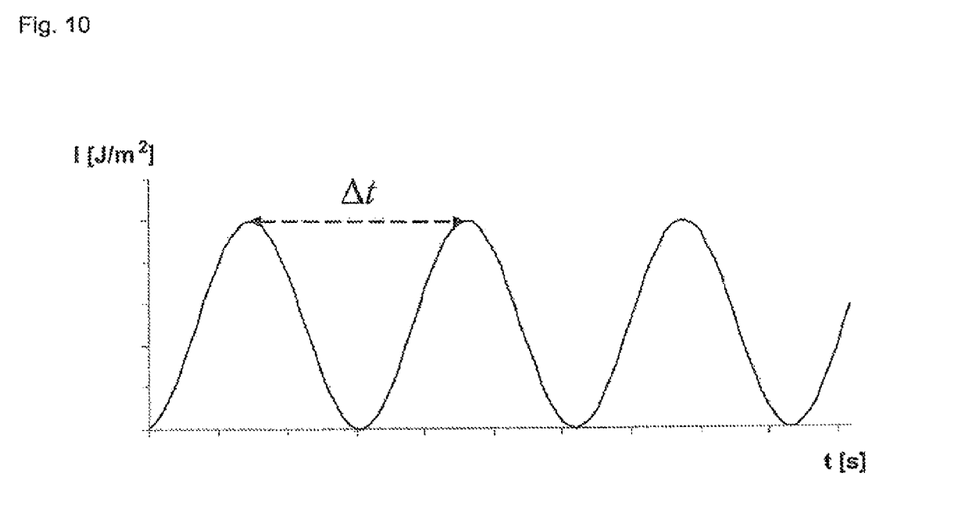
FIG. 10 shows the intensity of an interference signal as a function of time.

FIG. 10 shows intensity of the interference signal as a function of time. As already mentioned, the length changes of the resonator lie in the area of a tenth of the wavelength of the light radiated into the waveguide. The intensity curve during the length change serves for determining the frequency, with which the Kármán vortices are shed from the bluff body. For such purpose, the length of time between two intensity maxima is measured. From such length of time, the frequency, with which the Kármán vortices are shed by the bluff body can be determined.

The signal fed into the optical waveguide can come, for example, from a laser source. The intensity of the interference signal can be determined by a photodiode and can be converted into an electrical signal.

The invention claimed is:

1. A measuring arrangement for determining a chemical and/or physical, measured variable, of a measured material flowing through a pipeline, sid measuring arrangement comprising:
   a measuring transducer, said measuring transducer includes at least one optical waveguide, for producing, registering and/or transmitting measurement signals, wherein:
   the optical waveguide includes a core and a cladding and the registering of the measuring signals in said optical waveguide occurs by means of a Fabry-Pérot sensor including an optical resonator, said optical resonator being located in said optical waveguide and said optical waveguide and said optical resonator including at least one gap in the core.

2. The measuring arrangement as claimed in claim 1, wherein:
   said Fabry-Pérot sensor is composed at least partially of the optical waveguide.

3. The measuring arrangement as claimed in claim 1, wherein:
   said an optical resonator is located completely in said optical waveguide.

4. The measuring arrangement as claimed in claim 1, further comprising:
   a bluff body; and
   a sensor blade, wherein:
   the measuring arrangement is a vortex, flow measuring system including said bluff body arranged along a diameter of the pipeline and connected at least one securement location with the pipeline; and
   said bluff body serves for producing Kármán vortices and/or said sensor blade serves for registering pressure fluctuations produced by the vortices.

5. The measuring arrangement as claimed in claim 4, wherein:
   said bluff body and/or said sensor blade are/is introduced externally through a bore in the measuring tube wall; and
   said bluff body and/or said sensor blade include(s) a membrane covering the bore.

6. The measuring arrangement as claimed in claim 5, wherein:
   said optical waveguide is mechanically coupled with said bluff body and/or said sensor blade and/or said membrane and reacts to movements of said bluff body, said sensor blade, or said membrane with a length change.

7. The measuring arrangement as claimed in claim 4, wherein:
   from an interference pattern, which is derived from the intensity of the measurement signal transmitted through said optical waveguide, frequency, with which Kármán vortices are shed from said bluff body, is determinable.

8. The measuring arrangement as claimed in claim 2, wherein:
   the measuring arrangement is a Coriolis mass flow measuring system having at least one measuring tube, which vibrates in measurement operation; and
   said optical waveguide is mechanically coupled with said measuring tube, and said optical waveguide reacts to vibrations of the measuring tube with a length change.

9. The measuring arrangement as claimed in claim 8, wherein:
   from an interference pattern, which is derived from the intensity of the measurement signal transmitted through said optical waveguide, frequency of vibrations of the measuring tube is determinable, or, in the case of two measuring tubes, phase shift between respective frequencies of the two measuring tubes is determinable.

10. The measuring arrangement as claimed in claim 8, wherein:
    for determining intensity of the measurement signal and/or the interference pattern, at least one photodiode is provided, which produces an electrical signal corresponding to the measurement signal.

11. The measuring arrangement as claimed in claim 1, wherein:
    said measured variable is a volume flow and/or a mass flow.

12. A measuring arrangement for determining a chemical and/or physical, measured variable of a measured material flowing through a pipeline, said measuring arrangement comprising:
    a measuring transducer, said measuring transducer includes at least one optical waveguide for producing, registering and/or transmitting measurement signals, wherein:
    said optical waveguide is an optical single-mode waveguide and the registering of the measuring signals in said optical waveguide occurs by means of a Fabry-Perot sensor.

13. The measuring arrangement as claimed in claim 12, wherein:
    said optical waveguide is a single-mode glass fiber.

14. The measuring arrangement as claimed in claim 12, wherein:
    said Fabry-Perot sensor is composed at least partially of the optical waveguide.

15. The measuring arrangement as claimed in claim 12, comprising:
    a vortex, flow measuring system including: a bluff body arranged along a diameter of the pipeline and connected at least one securement location with the pipeline, and a sensor blade,
    said bluff body and/or said sensor blade being introduced externally through a bore in the measuring tube wall, said bluff body and/or said sensor blade including a membrane covering the bore; and said bluff body serving for producing Karman vortices and/or said sensor blade serving for registering pressure fluctuations produced by the vortices; wherein:
    said optical waveguide is mechanically coupled with said bluff body and/or said sensor blade and/or said membrane and said optical waveguide reacts to movements of said bluff body, said sensor blade, and said membrane, respectively, with a length change.

16. The measuring arrangement as claimed in claim 12, wherein:
    said measured variable is a volume flow and/or a mass flow.

17. The measuring arrangement as claimed in claim 1, wherein:
    said optical waveguide is an optical single-mode waveguide.

* * * * *